(12) United States Patent
Pakriswamy

(10) Patent No.: US 6,259,305 B1
(45) Date of Patent: Jul. 10, 2001

(54) METHOD AND APPARATUS TO DRIVE THE COIL OF A MAGNETIC WRITE HEAD

(75) Inventor: Elango Pakriswamy, Santa Clara, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/258,081

(22) Filed: Feb. 25, 1999

(51) Int. Cl.[7] ................................................. H03K 17/56
(52) U.S. Cl. ................................. 327/424; 327/110
(58) Field of Search ................................. 327/110, 112, 327/423, 424

(56) References Cited

U.S. PATENT DOCUMENTS

| | | | | |
|---|---|---|---|---|
| 5,483,404 | * | 1/1996 | Nakano | 361/18 |
| 5,867,334 | * | 2/1999 | Soichi et al. | 360/68 |
| 5,990,640 | * | 11/1999 | Dwyer et al. | 318/254 |
| 6,052,017 | * | 4/2000 | Pidutti et al. | 327/424 |
| 6,124,751 | * | 9/2000 | Pidutti | 327/424 |

OTHER PUBLICATIONS

"Gain of 1 for 5–Volt Read/Write Preamplifiers," VTC Inc., p. 7–5, Aug. 1994.

* cited by examiner

Primary Examiner—Terry D. Cunningham
Assistant Examiner—Quan Tra
(74) Attorney, Agent, or Firm—David V. Carlson; Theodore E. Galanthay; Lisa K. Jorgenson

(57) ABSTRACT

A circuit and method to drive an H-bridge circuit is disclosed. The H-bridge circuit uses NMOS transistors for both the upper and lower sets of transistors. An inductive head is coupled between the terminals of the transistors. When a logic signal is received, it is boosted with a circuit including a capacitor and is used to drive one of the upper transistors. The upper transistor selected to be driven is responsive to the logic signal. A corresponding lower transistor is also driven, forcing current through the inductive head in a first direction. When the logic signal is received that is the complement of the first logic signal, the other upper and lower transistors turn on, thereby driving current through the inductive head in the other direction. Since all of the transistors in the H-bridge circuit are NMOS transistors, boosted driving circuits are used to quickly change the direction of the flux through the inductive head.

21 Claims, 4 Drawing Sheets

METHOD AND APPARATUS TO DRIVE THE COIL OF A MAGNETIC WRITE HEAD

CROSS-REFERENCE TO RELATED APPLICATION

This application is related to patent application, filed on the same date herewith, Application No. 09/258,100, filed Feb. 25, 1999.

TECHNICAL FIELD

This invention relates to circuits for driving inductive loads and more particularly to a bridge circuit for driving the inductive coil of a magnetic write head of a disk drive.

BACKGROUND OF THE INVENTION

Most computer systems include one or more associated disk drives, which may be built into or external to the computer system. Typically, disk drives have at least one rotating magnetic medium and associated head mechanisms that are carried adjacent the magnetic material. The heads are radially positionable to selectively write information to, or read information from, precise positions on the disk medium. Such disk drives may be, for example, hard disk drives, floppy drives, or the like.

Data is written to the associated data disk by applying a series of signals to a write head according to the digital information to be stored on the magnetic disk media. The write head has a coil and one or more associated pole pieces that are located in close proximity to the disk media. As signals cause the magnetic flux to change in the head, the magnetic domains of the magnetic media of the disk are aligned in predetermined directions for subsequent read operations. Typically, a small space of unaligned magnetic media separates each magnetic domain transition to enable successive transitions on the magnetic media to be distinguished from each other.

Since the disk is moving relative to the head, it can be seen that if the small space separating the magnetic domain transitions is not sufficiently wide, difficulty may be encountered in distinguishing successive magnetic transitions. This may result in errors in reading the data contained on the disk, which is, of course, undesirable.

Meanwhile, as computers are becoming faster, it is becoming increasingly important to increase the speed at which data can be written to and read from the disk media. However, since the data signals are in the form of square wave transitions, if the rise time of the leading edges of the square waves is large, the small space between magnetic media transitions also becomes large, which reduces the effective rate at which data can be accurately written and read. Since the write head assembly includes at least one coil, forcing the current to rise rapidly, or to reverse flux directions within the write head is difficult.

In the past, data writing circuits used to supply such write signals to the heads included preamplifier circuits to drive the current through selected legs of an "H-bridge" circuit, which is capable of allowing relatively fast current reversals for accurate data reproduction.

An example of a typical H-bridge write head data driving circuit 10, according to the prior art, is shown in FIG. 1. The circuit 10 includes four MOS transistors, 12–15 connected between a $V_{CC}$ voltage 11 and ground reference 17. A coil 19, used, for example, to supply data pulses for writing to a disk drive media is integrated into the write head mechanism. The coil 19 is connected between the center legs of the H-bridge, as shown.

It can be seen that, depending on the gate biases applied to the respective transistors 12–15, the current flows through the coil 19 in one direction or another. That is, one current flow path includes the transistor 14, coil 19 from right to left, and transistor 13. The other current flow path includes transistor 12, the coil 19 from left to right, and the transistor 15.

In the H-bridge circuit 10, the transistors 12 and 14 serve as switching, transistors, which are controlled by the out-of-phase signals on a pair of respective input lines 28 and 29. The transistors 13 and 15 serve as current controlling transistors, which are controlled by the out-of-phase signals on the respective input lines 29 and 28 in a manner opposite from the connections to the switching transistors 12 and 14, via respective control transistors 31 and 32. The magnitude of the current through the transistors 13 and 15 is controlled by a transistor 21, with which the transistors 13 and 15 form respective current mirrors, when connected via respective transmission gates 24 and 25. The transmission gates 24 and 25 are controlled by the signals on the respective input lines 29 and 28, in the same manner as the associated transistors 31 and 32. A reference current source 26 supplies the reference current to the transistor 21, which is mirrored by currents in respective transistors 13 and 15, as described above.

Thus, the data drive signals supplied to the head mechanism associated with the circuit 10 may be controlled by applying appropriate signals to the input lines 28 and 29. However, as mentioned, as data rates increase, the rates at which the heads can accurately write the data to the magnetic media is limited by the speed at which the flux in the coil 19 (and its associated components) can be reversed. The maximum data rate is thus limited to the maximum physical flux reversal rate of the driver circuitry.

What is needed, therefore, is a method and circuit for driving an inductive load of the type used in conjunction with a write head of a disk drive with a signal that enables a maximum flux reversal rate in the driver coil.

SUMMARY OF THE INVENTION

According to one advantage of the invention, an H-bridge circuit for use in a disk drive is disclosed. The circuit includes a pair of upper NMOS transistors and a pair of lower NMOS transistors. The drains of the upper transistors are coupled to a voltage source, while the sources of the lower transistors are coupled to ground. The write head is placed between the sources of the upper transistors, which is also between the drains of the lower transistors. Each of the transistors are driven by a separate driving circuit that accepts a data signal input.

According to another aspect of the present invention, a method of driving an H-bridge circuit begins with accepting a data signal and a data complement signal. A capacitor is used to boost one of these signals (depending on the value of the signals). Then one of the upper transistors is driven with the boosted signal, and one of the lower transistors is also selected to be driven based on the value of the signals.

DETAILED DESCRIPTION OF THE INVENTION

Figure 1:
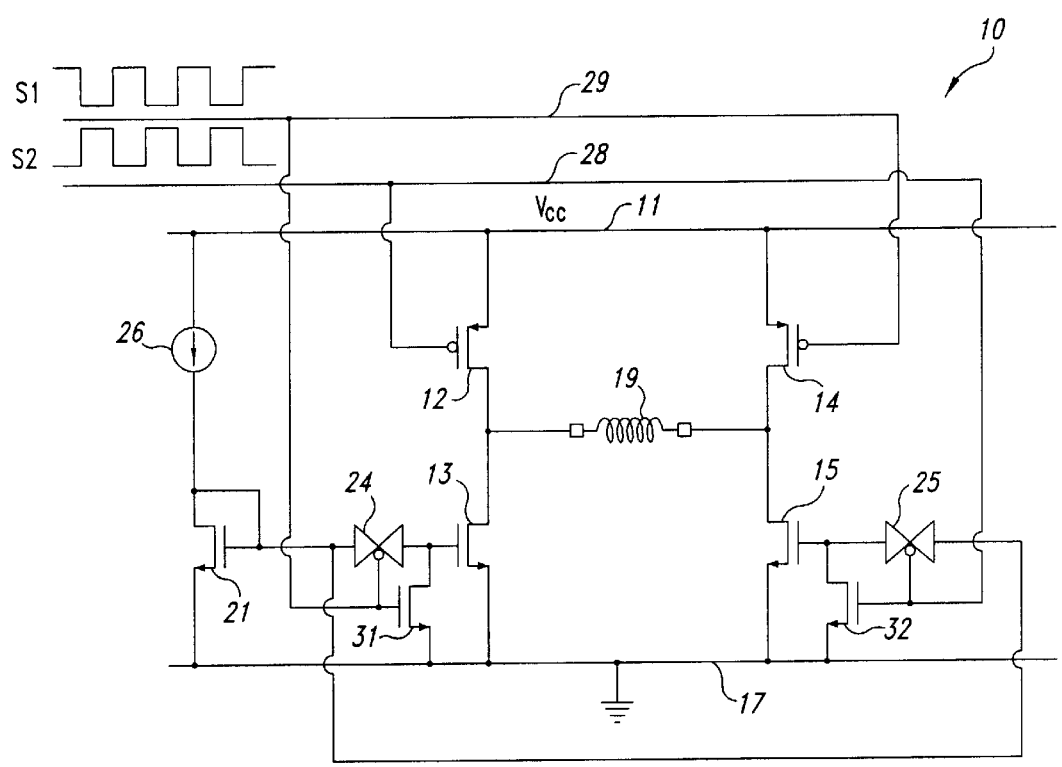
FIG. 1 is a schematic diagram of an H-bridge circuit for driving a coil of a magnetic write head, in accordance with the prior art.
Figure 2:
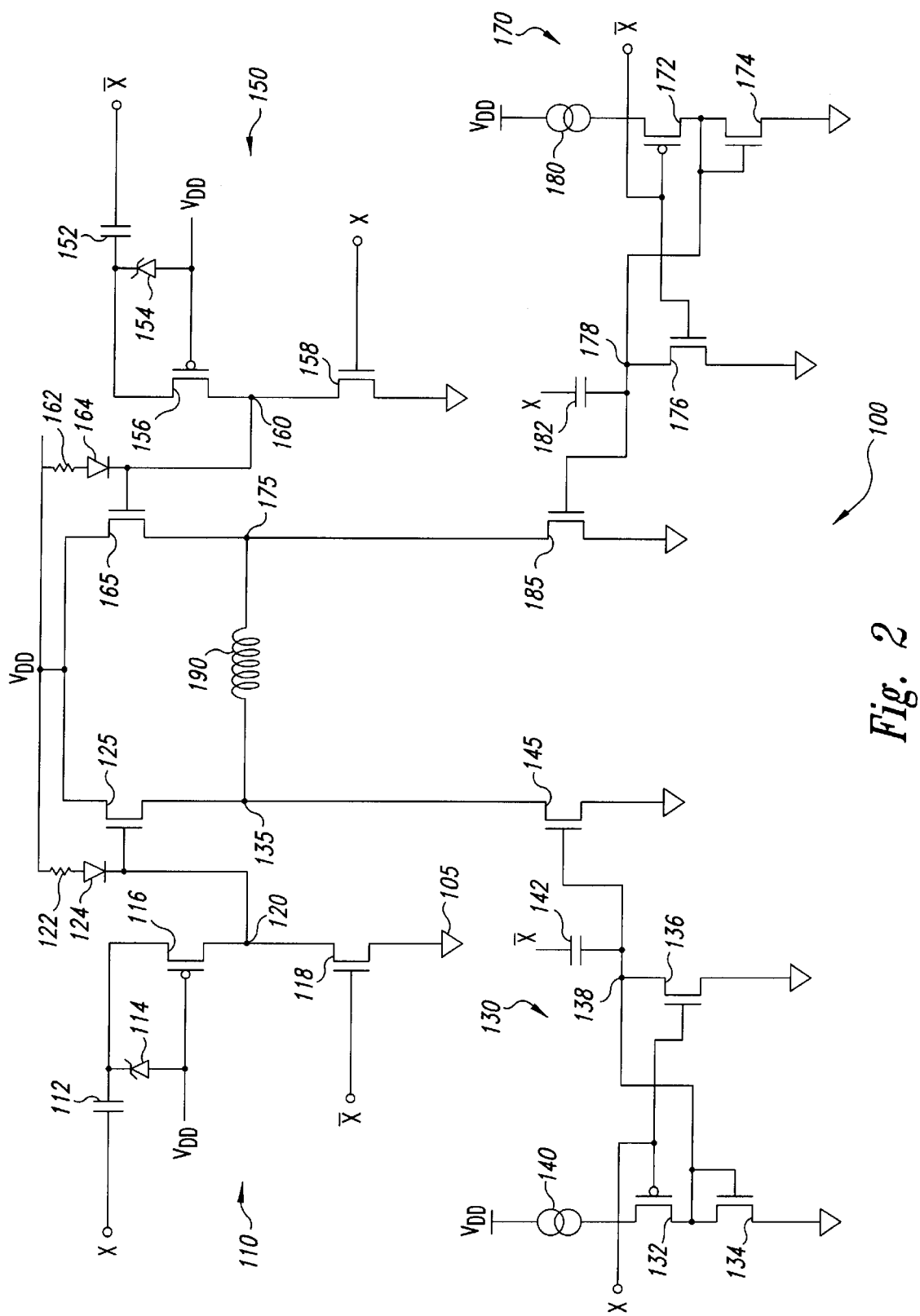
FIG. 2 is a schematic diagram of an H-bridge circuit for driving a coil of a magnetic write head according to the present invention.

FIG. 2 shows a bridge circuit 100 used to drive a coil 190 in a magnetic write head. Although the coil 190 is shown as an inductor, those skilled in the art will recognize that the coil behaves in a manner unlike an ideal inductor. This behavior is caused by such effects as, e.g., parasitic capacitance of coil driving transistors, resistance effects in the coil 190 and other components of the bridge circuit 100, and various other factors. It is also recognized that the bridge circuit 100, although described in this embodiment with reference to an inductive coil 190 for use in a magnetic write head, can be used to drive other components properly situated within the circuit 100, such as windings of a drive motor, an alternator used as a braking mechanism, or other compatible devices. The invention is not limited to the embodiment described herein nor the examples listed above, and is intended to be broad in scope.

The coil 190 is driven by four bridge transistors including two upper transistors, 125 and 165, and two lower transistors, 145 and 185. In the embodiment shown in FIG. 2, the four bridge transistors are all N-type MOS transistors, but other types of transistors or current directing devices could be used as well. The bridge circuit 100 is configured such that the upper transistor 125 and lower transistor 185 are both on hard when magnetic flux is to be written in a first direction on the disk media by the coil 190. As seen in FIG. 2, this causes the current flow from left to right across the coil 190. Conversely, when magnetic flux in a second direction is to be written to the disk media, the bridge circuit 100 turns on the upper transistor 165 and the lower transistor 145, thereby forcing the current from right to left across the coil 190. The individual driving circuits that drive the upper transistors 125, 165 and the lower transistors 145 and 185 are described below.

A driving circuit 110 drives the upper transistor 125. The driving circuit 110 accepts both a data signal, X, and a data complement, $\overline{X}$. The data signal X is coupled to one plate of a storage device or a capacitor 112, while the data complement is coupled to a gate of an MOS transistor 118. A node 120, which is coupled to a gate of the upper transistor 125, separates the MOS transistor 118 from an MOS transistor 116, shown here as P-type. The gate of the MOS transistor 116 is coupled to a $V_{DD}$ voltage of, for example, 8 volts. The $V_{DD}$ voltage is also coupled to an anode of a diode 114, which can be of the zener or schottky type. The cathode of the diode 114 is coupled to a second plate of the capacitor 112 and to the source of the MOS transistor 116.

In operation, the anode of the diode 114 is coupled to the constant $V_{DD}$ voltage. Therefore, in a steady state, the plate of the capacitor 112 coupled to the cathode of the diode 114 is charged to a voltage of $V_{DD}$ minus the diode threshold voltage, typically around 0.7 volts. Therefore, if the $V_{DD}$ voltage is 8 volts, the second plate of the capacitor 112 charges to about 7.3 volts in the steady state.

The input signal X provides input data signals to the bridge circuit 100. Typically, a voltage such as 5 volts on the signal line X indicates that magnetic flux of the first direction is to be written by the coil 190 to the disk drive media. Similarly, a voltage of 0 volts received on the signal line X indicates that magnetic flux of the second direction is to be written on the disk drive media. The signals X and $\overline{X}$ are always out of phase such that when one is at 5 volts, the other is at 0, and vice versa.

Assume X, in its steady state, has a value of 0 and is changing to 5 volts. This occurs when a logic value 1 is to be written by the coil 190. In the steady state, the second plate of the capacitor 112 rests at 7.3 volts. When X changes from 0 volts to 5 volts, the capacitor 112 maintains the same voltage differential between the plates as it had previously, i.e., 7.3 volts. Therefore, the second plate of the capacitor 112 escalates to approximately 12.3 volts in the same time X changes from 0 to 5 volts. This voltage differential causes the MOS transistor 116 to turn on and a voltage near 12 volts becomes present at the node 120. When X changes from 0 volts to 5 volts, $\overline{X}$ changes from 5 volts to 0 volts. Having $\overline{X}$ at 0 volts causes the MOS transistor 118 to turn off, thereby isolating the node 120 from a reference voltage 105, indicated in FIG. 2 as a ground symbol.

This 12.3 volt voltage at the node 120 is coupled to the gate of the upper transistor 125. Because of some leakage effects through the transistor 118 and other areas, the voltage on the capacitor 112 can begin to reduce with time. Therefore, a resistor 122 and diode 124 are coupled between the $V_{DD}$ voltage and the gate to the transistor 125. These components replenish any leaking current and thus ensure the gate of transistor 125 does not drop below the $V_{DD}$ voltage, less a diode drop, the entire time the data signal X is at 5 volts.

When the data signal X changes from 0 to 5 volts, the driving circuit 110, as explained above, turns on the upper transistor 125 very hard. As described below, a driving circuit 150 simultaneously couples the gate of the upper transistor 165 to ground, thereby ensuring that no current flows through the transistor 165.

The driving circuit 150 is similar in configuration to the driving circuit 110, however, the signals are complemented. That is, the $\overline{X}$ data signal is coupled to the first plate of a transistor 152 and the data signal X is coupled to a transistor 158. A node 160 sits between the transistor 158 and a transistor 156, the drain of which is also coupled to the second plate of the capacitor 152. A $V_{DD}$ voltage is connected to a gate of the transistor 156 as well as to an anode of a diode 154, the cathode of which is also coupled to the second plate of the capacitor 152. Additionally, a resistor 162 and diode 164 couple the gate of the transistor 165 to the $V_{DD}$ voltage.

In operation, as X goes from 0 volts to 5 volts, the transistor 158 turns on, coupling node 160, and the gate of the transistor 165 to ground. The PMOS transistor 156 is in an off state. Although some current is carried through the resistor 162 and the diode 164, this current is carried directly to ground through the transistor 158. The resistor 162 is sized to limit this current flow.

Therefore, when the data signal X goes from 0 to 5 volts, the upper transistor 125 turns on hard while the gate of the upper transistor 165 is coupled to ground and is off. Because the driving circuits 110 and 150 are symmetrical, the opposite is also true. That is, when the data signal X goes from 5 volts to 0 volts (and correspondingly, the data signal $\overline{X}$ goes from 0 volts to 5 volts), the upper transistor 165 turns on hard while the upper transistor 125 will be coupled to ground, by virtue of the transistor 118 being turned on.

The lower transistors 145 and 185 are also controlled by a symmetrical pair of driving circuits 130 and 170. Similar to the driving circuits described above, the driving circuits 130 and 170 accept opposite data signals at their respective components.

In the driving circuit 130, a current source 140 is coupled in series to a PMOS transistor 132 and to a diode-connected transistor 134. The data signal X drives a gate of the PMOS transistor 132 as well as a gate of an MOS transistor 136. The drain of the transistor 136 is coupled to a node 138, which couples the drain and gate of the diode-connected transistor 134 with a plate of a capacitor 142, and a gate of the lower transistor 145. The other plate of the capacitor 142 is driven by the data signal $\overline{X}$.

In operation, when the data signal X goes from 0 to 5 volts, the transistor 136 turns on, pulling node 138 to ground. Because the data signal X is at 5 volts, the PMOS transistor 132 stays off. Additionally, any charge accumulated on the capacitor 142 is pulled to ground through the transistor 136. Therefore, the lower transistor 145, when X changes from 0 to 5 volts, is off.

When the data signal X is changing from 0 to 5 volts, the data signal $\overline{X}$ is changing from 5 volts to 0 volts. The driving circuit 170 that drives the gate of the lower transistor 185 is nearly identical to the driving circuit 130. However, it is driven by opposite signals. Specifically, it is the $\overline{X}$ data signal that drives the gates of transistors 176 and 172 and the data signal X that is coupled to a capacitor 182. The node 178 couples the drain of the transistor 172, the drain and gate of the transistor 174, the drain of the transistor 176, the second plate of the capacitor 182, and the gate for the transistor 185.

As the data signal X changes from 0 volts to 5 volts, the data complement $\overline{X}$ changes from 5 volts to 0 volts. This causes the transistor 176 to turn off, thus isolating the node 178 from the ground voltage. The transistor 172 is conducting, thus current is generated by a current generator 180, that flows through the transistors 172, and the diode-connected transistor 174. As the data signal X goes from 0 volts to 5 volts, the capacitor 182 brings up the voltage at the node 178. This causes the transistor 185 to turn on hard.

As described above, when the data signal X changes from 0 volts to 5 volts, the upper transistor 125 and lower transistor 185 are both on hard. Thus, current flows through the transistor 125, across the transistor 190 from left to right and through the lower transistor 185 to ground. The other transistors, 145 and 165 are both off during this time. When the data signal X changes from 5 volts to 0 volts, the reverse is true. That is, the upper transistor 165 turns on, allowing current to flow from right to left through the coil 190 and through the transistor 145 to ground.

Figure 3A:
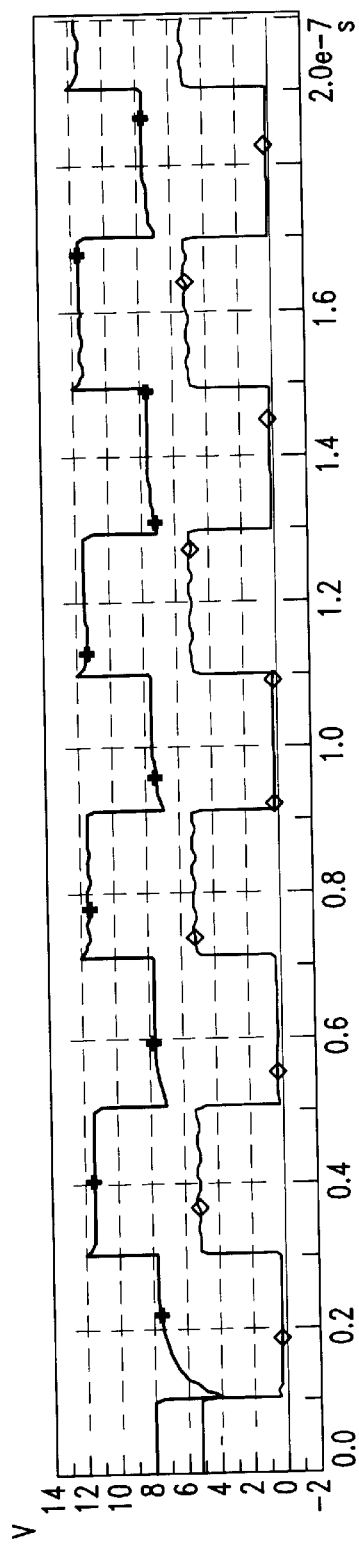
FIGS. 3a–3b are graphs showing a simulated output of an embodiment of the present invention.
Figure 3B:
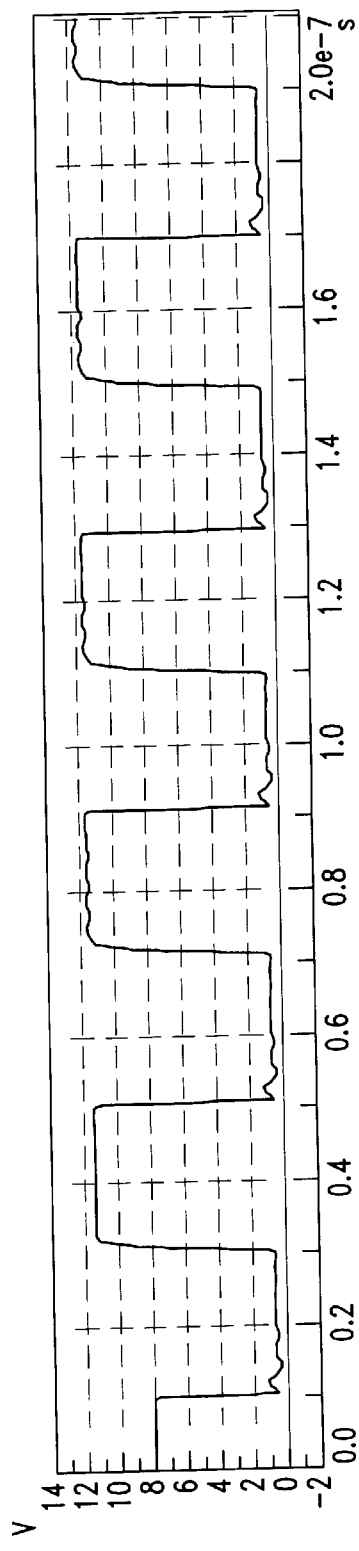

FIGS. 3a and 3b show simulation results from the embodiment of the invention described with respect to FIG. 2. In FIG. 3a, two waveforms are shown. The upper waveform shows the voltage on the cathode of the diode 114, while the lower waveform shows the data signal X. Beginning at 0.2*10−7 seconds, the data signal X is at 0 volts while the capacitor 112 is charged to $V_{DD}$, or 8 volts. When the data signal X raises to 5 volts at 0.3*10−7 seconds, the capacitor 112 likewise raises almost 5 additional volts, to nearly 12 volts. This voltage is passed through transistor 116 to node 120, and drives the gate of the transistor 125 very hard. When the data signal X relaxes back to 0 volts, the capacitor 112 is again charged through the diode 114 back to nearly 8 volts. Then the cycle repeats.

FIG. 3b shows the voltage on the node 120 for the same time periods as shown in FIG. 3a. When the data signal X increases from 0 to 5 volts, nearly 12 volts is applied to the gate of the transistor 125. When the data signal X drops to 0 volts, the node 120 is coupled to ground, and is at the 0 volt level, as seen in FIG. 3b.

Figure 4:
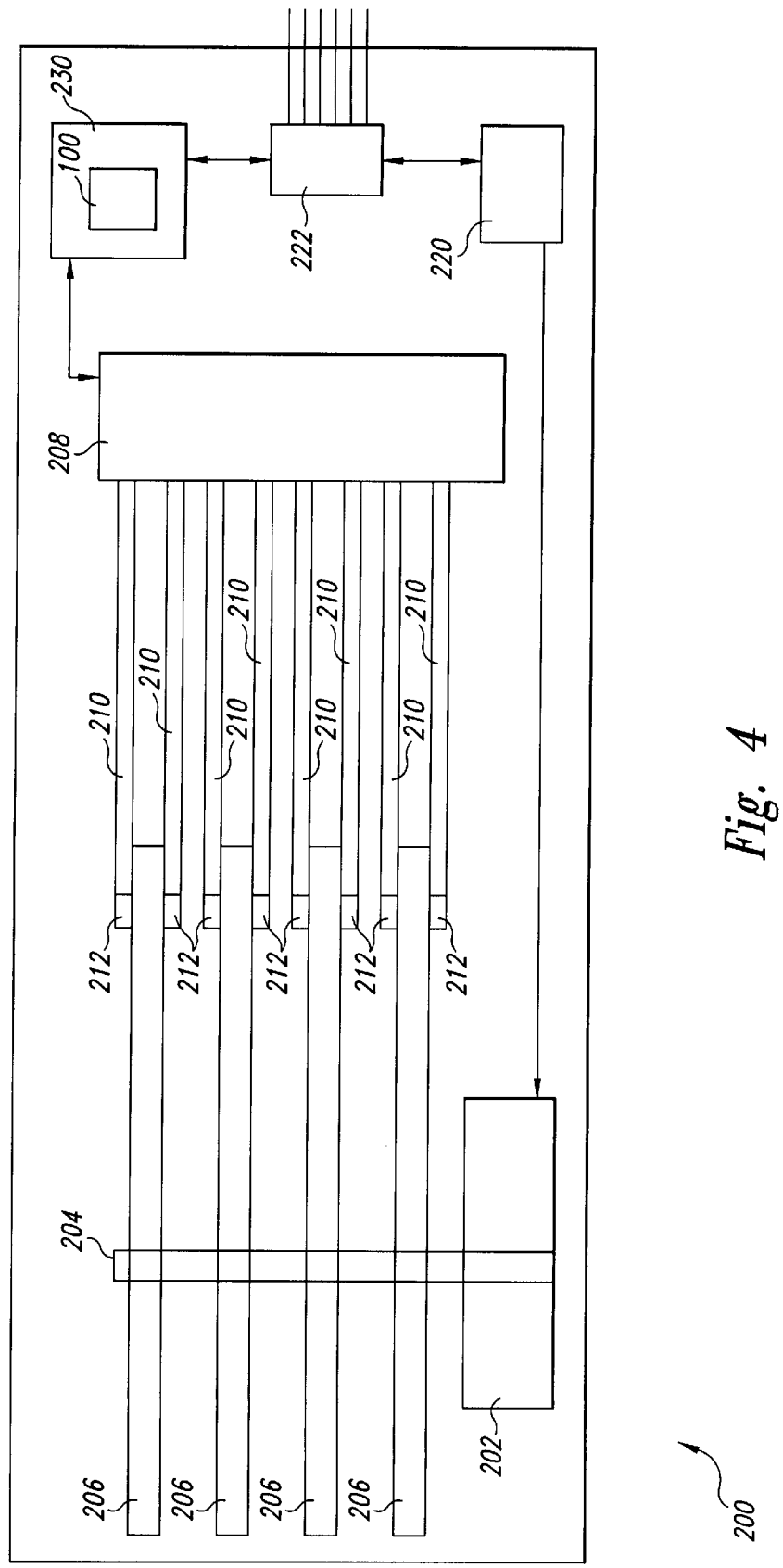
FIG. 4 is a diagram of a disk drive that contains an embodiment of the present invention.

FIG. 4 is a diagram of a disk drive that can be used to store data in, for instance, a computer (not shown). The drive 200 includes a motor 202 for rotating a spindle 204 which in turn rotates platters of storage media 206. Although four platters 206 are shown in FIG. 4, more or less platters could be used as is known in the art. The drive 200 also contains an actuator 208 that provides support for a number of support arms 210. The number of support arms 210 will generally be twice the number of platters 206 contained in the disk drive 200, although more or less support arms 210 could be used. At the end of each support arm 210 is a head 212 used to write data to and read data from a respective platter 206. Generally, the platters 206 have a magnetic storage medium on both sides, thus one head 212 will be positioned near both sides of each platter 206. In operation, the heads 212 float on a cushion of air very close to the spinning platters 206.

A controller 220 receives signals from an interface unit 222. The interface unit 222 receives control and data signals from the computer system (not shown). The interface unit 222 is typically coupled to the computer system via a bus such as a PCI or SCSI bus (not shown), as is well known in the art. The interface unit 222 is also coupled to a head control circuit 230, which is in turn coupled to the actuator 208. The head control circuit 230 contains the bridge circuit 100 of FIG. 2.

In operation, signals from the computer system are sent along the bus to the interface unit 222. The interface unit 222 processes the command and data signals, and passes signals to the head control circuit 230. Data signals are processed by the bridge circuit 100 and to the heads 212. These data signals are then recorded in the media on the platters 206. Data read from the media on the platters 206 is sensed by the head 212 or another data read head (not shown), also coupled to the arm 210. These signals are carried through the head control unit 230, through the interface unit 222 and back out to the bus for use by the computer system. Additionally, the interface unit 222 sends signals to the controller 220, which is used to control the motor 202.

Although various specific examples have been used herein to describe embodiments of the invention, it is well recognized that equivalent substitutions can be made for some of the components used. Also, in the sake of brevity, a description of operation of well known devices has been omitted. The scope of the invention is determined solely by the scope of the claims.

What is claimed is:

1. An H-bridge circuit comprising:
    an inductive element coupled between a first and a second node;
    a first MOS transistor having a first terminal coupled to a voltage source and having a second terminal coupled to the first node, the first MOS transistor driven by a first driving circuit including a first transistor having a data signal applied to its source;
    a second MOS transistor having a first terminal coupled to the voltage source and having a second terminal coupled to the second node, the second MOS transistor driven by a second driving circuit including a first transistor having a data signal applied to its source;
    a third MOS transistor having a first terminal coupled to the first node and having a second terminal coupled to a reference voltage, the third MOS transistor driven by a third driving circuit; and
    a fourth MOS transistor having a first terminal coupled to the second node and having a second terminal coupled to the reference voltage, the fourth MOS transistor driven by a fourth driving circuit.

2. The circuit of claim 1 wherein the first and second driving circuits each comprise:
- a capacitor coupled between the data signal and the first transistor;
- the voltage source driving the gate of the first transistor, and the voltage source coupled to a diode that is also coupled to the capacitor;
- a second transistor coupled between the first transistor and the reference voltage, the second transistor driven by a data complement signal; and
- a node between the first transistor and the second transistor, the node coupled to the respective MOS transistor of the H-bridge circuit.

3. The circuit of claim 2 wherein each of the driving circuits further comprises:
- a resistive element having a first terminal coupled to the reference voltage; and
- a second diode coupled between a second terminal of the resistive element and the node.

4. The circuit of claim 2 wherein the data signal and the data complement are logical complements of one another.

5. The circuit of claim 1 wherein the data signal of the first driving circuit is the complement of the data signal of the second driving circuit.

6. The circuit of claim 1 wherein the third and fourth driving circuits each comprise:
- a first and a second transistor driven at their gates by a data signal;
- a diode-coupled transistor coupled between the first transistor and the reference voltage;
- a current source coupled a source of the first transistor;
- a node coupling the drain and gate of the diode-coupled transistor, the drain of the second transistor, and the gate of the respective MOS transistor; and
- a capacitor coupled to the node and structured to accept a data complement signal.

7. The circuit of claim 6 wherein the data signal and the data complement signal are logical complements of one another.

8. The circuit of claim 6 wherein the data signal of the third driving circuit is the logical complement of the data signal of the fourth driving circuit.

9. In a disk drive, an H-bridge circuit coupled to a write head, the circuit comprising:
- a first pair of NMOS transistors having gates that are coupled to a unidirectional current device that is coupled to a voltage source, and having drains that are coupled together and coupled to the voltage source, the write head coupled between the sources of the first pair of NMOS transistors;
- a second pair of NMOS transistors each having a source coupled to a reference voltage, the write head coupled between the drains of the second pair of NMOS transistors;
- a plurality of driver circuits each having an output coupled to a gate of a respective one of the NMOS transistors, the driver circuits structured to accept a data signal as an input.

10. The circuit of claim 9 wherein the driver circuits all include a capacitor coupled in series with the data signal.

11. The circuit of claim 9 wherein the driver circuits coupled to the first pair of NMOS transistors each comprise:
- a first plate of a capacitor structured to receive a first data signal;
- a first and a second transistor coupled in series between a second plate of the capacitor and the reference voltage, the gate of the first transistor coupled to a voltage source and the gate of the second transistor coupled to a second data signal;
- a unidirectional current carrying device coupled between the voltage source and the second plate of the capacitor; and
- an output node positioned between the first and second transistors, the output node coupled to the gate of the respective NMOS transistor of the first pair.

12. The circuit of claim 11 wherein each of the driver circuits further comprises:
- a resistive element having a first terminal coupled to the reference voltage; and
- a second unidirectional current carrying device coupled between a second terminal of the resistive element and the output node.

13. The circuit of claim 11 wherein the first data signal and the second data signal are complements of one another.

14. The circuit of claim 11 wherein the first data signal of one of the driver circuits is the complement of the first data signal of the other driver circuit.

15. The circuit of claim 9 wherein the driver circuits coupled to the lower NMOS transistors each comprise:
- in series, a current source, a first transistor and a diode-coupled transistor coupled to the reference voltage;
- a second transistor coupled between the output and the reference voltage, the gate of the second transistor coupled to the gate of the first transistor and coupled to a first data signal; and
- a capacitor accepting a second data signal and coupled to the output.

16. The circuit of claim 15 wherein the first data signal and the second data signal are complements of one another.

17. The circuit of claim 15 wherein the first data signal of one of the driver circuits is the complement of the first data signal of the other driver circuit.

18. A method of providing current to an inductor in an H-bridge circuit that has a first pair and a second pair of NMOS transistors, the method comprising:
- accepting a data signal and a data complement signal;
- using a capacitor to boost either the data signal or the data complement signal; and
- driving a selected one of the first pair of transistors with the boosted signal utilizing a driving circuit including a first transistor having one of the data signal and the data complement signal applied to its source, the driven transistor selected responsive to the data signal.

19. The method of claim 18 wherein one of the second pair of transistors is driven when the selected one of the first pair of transistors is driven.

20. The method of claim 19 wherein the driven transistors force current through an inductive element in a first direction when the data signal is at a logic high, and wherein the driven transistors force current through the inductive element in a second direction when the data signal is at a logic low.

21. In a disk drive, an H-bridge circuit coupled to a write head, the circuit comprising:
- a first pair of NMOS transistors having drains that are coupled together and coupled to a voltage source, the write head coupled between the sources of the first pair of NMOS transistors;
- a second pair of NMOS transistors each having a source coupled to a reference voltage, the write head coupled between the drains of the second pair of NMOS transistors;

a plurality of driver circuits each having an output coupled to a gate of the respective one of the NMOS transistors, the driver circuits structured to accept a data signal as an input, wherein the driver circuits coupled to the lower NMOS transistors each comprise;
   in series, a current source, a first transistor and a diode-coupled transistor coupled to the reference voltage;
a second transistor coupled between output and the reference voltage, the gate of the second transistor coupled to the gate of the first transistor and coupled to a first data signal; and
a capacitor accepting a second data signal coupled to the output.

* * * * *